July 21, 1925.  
W. W. SMITH  
GRAPE SHEARS  
Filed Nov. 30, 1923  
1,546,867
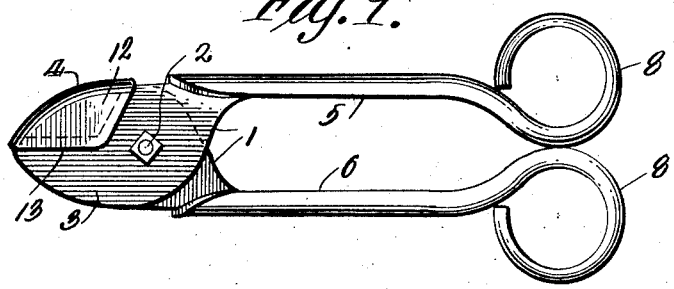
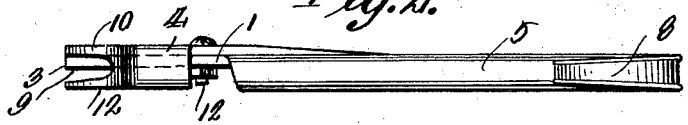
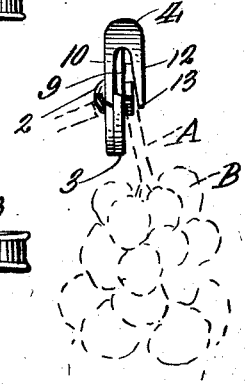
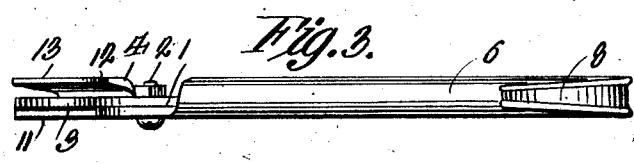
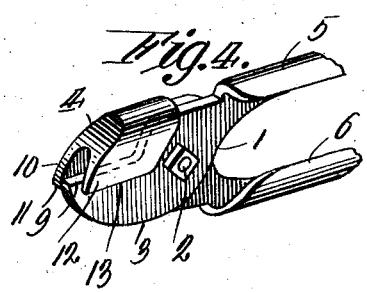
WITNESSES.
Inventor  
WILLIAM W. SMITH  
By Richard B. Owen, Attorney Patented July 21, 1925.

1,546,867

UNITED STATES PATENT OFFICE.

WILLIAM W. SMITH, OF PROSSER, WASHINGTON.

GRAPE SHEARS.

Application filed November 30, 1923. Serial No. 677,804.

*To all whom it may concern:*

Be it known that I, WILLIAM W. SMITH, citizen of the United States, residing at Prosser, in the county of Benton and State of Washington, have invented certain new and useful Improvements in Grape Shears, of which the following is a specification.

The present invention relates to grape shears and has for its principal object to provide shears embodying a structure whereby a bunch of grapes may be efficiently severed from a vine and the stem thereof held by the shears so that the bunch of grapes may be lifted over and then released so as to be disposed in a container or the like.

It is the usual custom to hold a bunch of grapes in one hand and a pair of shears in the other when severing the grapes from the vine. This handling of the grapes is injurious thereto in that it spots the grapes and detracts from their appearance so that they are not as salable as when they have not been handled directly. With the shears disclosed in this application there is no necessity of the hands coming into contact with the grapes and thus they will retain their original appearance just as they were when actually on the vine.

Another important object of the invention is to provide shears of this nature possessed of a simple and efficient construction, which are reliable, comparatively inexpensive to manufacture, durable, easily manipulated, compact and otherwise well adapted for the purpose for which they are designed.

With the above and numerous other objects in view as will appear as the description progresses, the invention resides in the novel features of construction, and in the combination and arrangement of parts as will be hereinafter more fully described and claimed.

In the drawing:

Figure 1 is a side elevation of a shears embodying my invention;

Figure 2 is an edge elevation thereof;

Figure 3 is another edge elevation thereof opposite to that disclosed in Figure 2;

Figure 4 is a detail perspective view of the shears showing portions of the handles removed; and Figure 5 is an edge elevation of the shears.

Referring to the drawing in detail it will be seen that the shears consist of a pair of levers 1 which are fulcrumed together intermediate their ends by means of a bolt 2 or the like so as to provide short arms on one side of the pivot and long arms on the other. The short arms are in the form of blades 3 and 4. The long arms are in the form of shanks 5 and 6 having finger loops 8 at their ends which will be in abutment with each other when the blades are closed.

The blade 3 is more or less of conventional construction being provided with the cutting edge 9. The body 10 of the blade 4 is similar in construction with the blade 3 and is provided with the cutting edge 11 adapted to associate with the cutting edge 9 of the blade 3 for severing the stem of a bunch of grapes or the like. The blade 4, however, is provided with an overhanging extension 12 which is so constructed that the blade 4 is substantially U-shaped in cross section. The overlying extension 12 is of practically a duplicate construction as the body 10 and its edge 13 is spaced from the edge 11 and also from the edge 9 of the blade 3 when the blades are closed so that the space between the blade 3 and the overlying extension 12 is a little less than the average thickness of the stems of bunches of grapes. It will thus be seen that when the stem is severed, as is indicated in Figure 5 the severed portion A forming part of the bunch of grapes B will be caught between the edge 9 of the blade 3 and the overlying extension 12 of the blade 4. When thus disposed the bunch of grapes may be carried or lifted so as to be placed in a suitable container or the like and then the blades may be opened thus releasing the severed stem A.

It is evident, of course, that these shears may be used with other fruit besides grapes and also in numerous other ways wherever it is desired to hold the severed article after it has been cut. The particular embodiment of the invention which I have described with a certain degree of particularity refers to the preferred form thereof and it is evident that numerous changes in the details of construction and in the combination and arrangement of parts may be resorted to without departing from the spirit or scope of the invention as hereinafter claimed or sacrificing any of its advantages.

What is claimed is:

Grape shears or the like including a pair of levers crossed and pivoted together intermediate their ends to provide short arms in the form of blades having cooperating longitudinal cutting edges at their inner sides and long arms in the form of shanks having finger loops at the free outer ends thereof, one of said blades having a similarly shaped extension on the outer edge thereof, projecting inwardly beside one blade and having an unsharpened edge, said one blade and its extension being in spaced relation for reception of the other blade therebetween when the blades are forced together to sever the stem of a bunch of grapes or the like, and the extension being disposed to lie spaced from the outer side of said other blade a distance slightly less than the average thickness of stems of bunches of grapes or the like, whereby the severed part of the stem will be gripped between said other blade and the extension for handling the bunch of grapes or the like until the blades are separated.

In testimony whereof I affix my signature in presence of two witnesses.

WILLIAM W. SMITH.

Witnesses:
R. E. WISE,
G. S. TAYLOR.